United States Patent [19]

Stevens

[11] Patent Number: 4,725,074
[45] Date of Patent: Feb. 16, 1988

[54] VEHICLE SUSPENSION

[75] Inventor: Anthony Stevens, Warwick, England

[73] Assignee: GKN Technology Limited, West Midlands, England

[21] Appl. No.: 835,374

[22] PCT Filed: Jul. 19, 1985

[86] PCT No.: PCT/GB85/00324

§ 371 Date: Mar. 3, 1986

§ 102(e) Date: Mar. 3, 1986

[87] PCT Pub. No.: WO86/00854

PCT Pub. Date: Feb. 13, 1986

[30] Foreign Application Priority Data

Jul. 25, 1984 [GB] United Kingdom ............... 8418907

[51] Int. Cl.⁴ .................................................. B60G 3/00
[52] U.S. Cl. ..................................... 280/719; 267/36.1; 267/229; 280/688
[58] Field of Search ............... 280/719, 694, 720, 689, 280/669, 663, 688; 267/11 R, 19 R, 19 A, 36 R, 47, 54 R, 31 R

[56] References Cited

U.S. PATENT DOCUMENTS

| | | | |
|---|---|---|---|
| 1,841,849 | 1/1932 | Röhr | 280/669 |
| 2,695,791 | 11/1954 | Heftler | 280/719 |
| 2,697,613 | 12/1954 | Giarosa | 280/719 |
| 2,755,098 | 7/1956 | Jochumsen | 280/719 |
| 4,422,666 | 12/1983 | Proctor | 280/719 |
| 4,557,500 | 12/1985 | Collard et al. | 280/719 |
| 4,619,466 | 10/1986 | Schaible et al. | 280/688 |

FOREIGN PATENT DOCUMENTS

| | | | |
|---|---|---|---|
| 3122417 | 12/1982 | Fed. Rep. of Germany . | |
| 2486461 | 1/1982 | France . | |
| 2520304 | 7/1983 | France | 280/719 |
| 1224196 | 3/1971 | United Kingdom . | |
| 2149729 | 6/1985 | United Kingdom . | |

*Primary Examiner*—Richard A. Bertsch
*Attorney, Agent, or Firm*—Marshall, O'Toole, Gerstein, Murray & Bicknell

[57] ABSTRACT

A suspension for a pair of wheels of a motor vehicle, comprising a pair of pivoted arms (14) supporting the wheels (10) relative to the vehicle, and a leaf spring (16) extending transversely of the vehicle and connected to the arms. The leaf spring is supported between its ends at two spaced positions, for pivotal movement about horizontal axes, so that the spring is also effective to resist roll of the vehicle.

6 Claims, 3 Drawing Figures

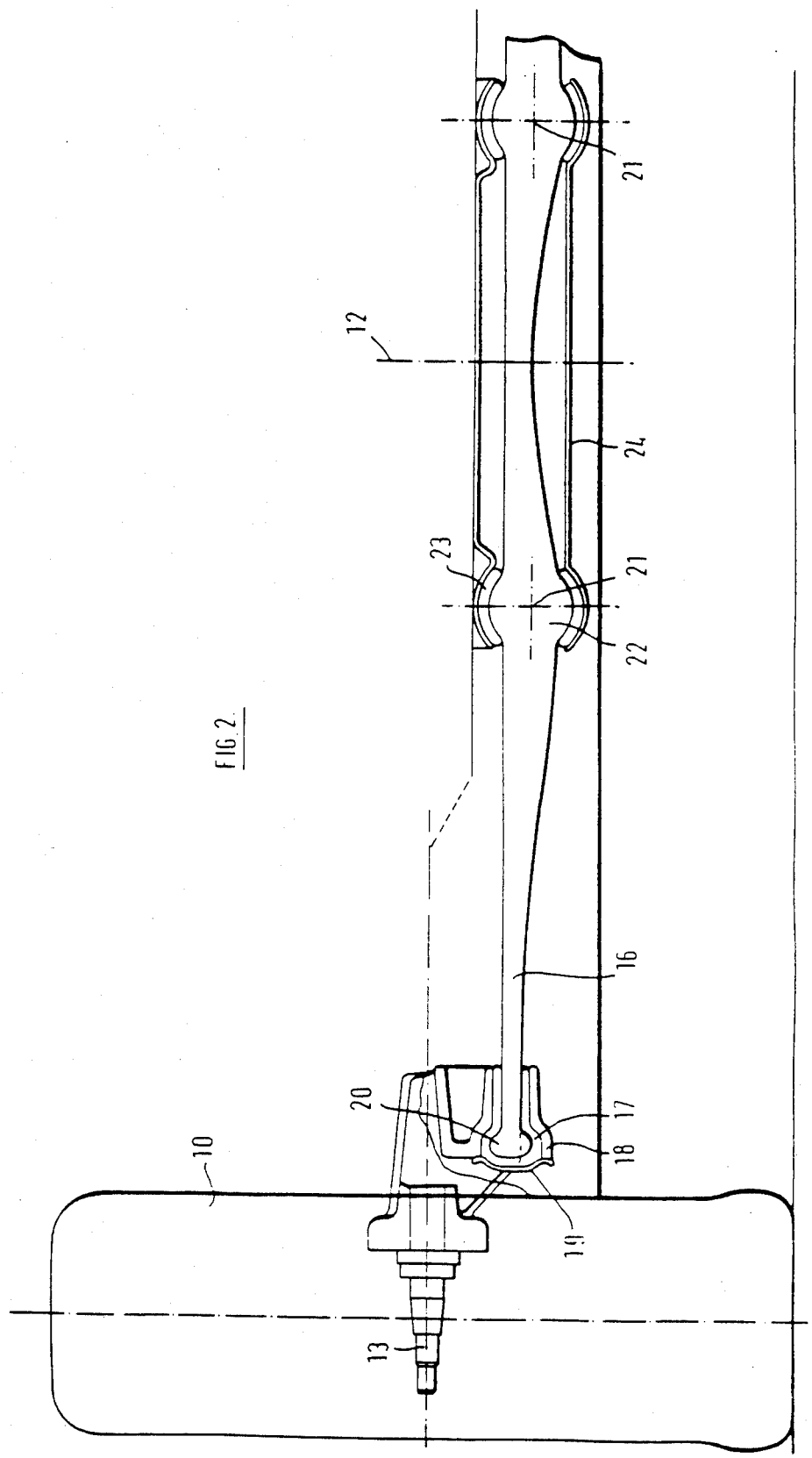

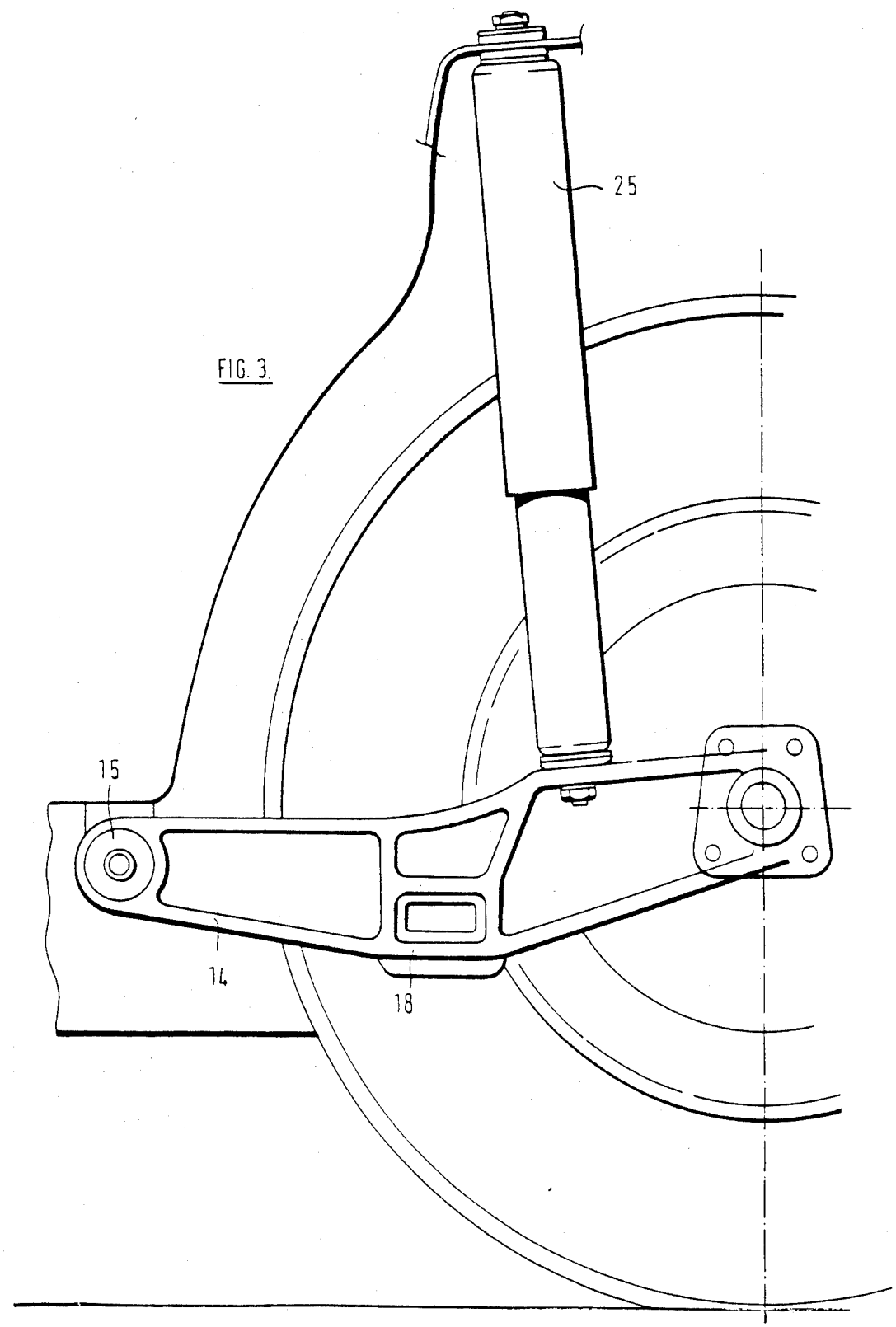

VEHICLE SUSPENSION

This invention relates to a suspension for a pair of wheels of a motor vehicle. It is a broad object of the invention to provide a suspension which provides a good performance whilst being economical in components used.

A motor vehicle suspension has been proposed, in GB-PS 1224196, comprising a pair of suspension arms pivotally connected at their front ends to the vehicle, and connected between their ends to a live or dead axle beam. Rear end portions of the suspension arms are connected to a leaf spring extending transversely of the vehicle, the leaf spring being connected to the vehicle at spaced supports between which the spring is able to flex. Such connection of the transverse leaf spring to the vehicle enables the spring to resist roll of the vehicle, i.e. different vertical displacements of the two wheels relative to the vehicle.

However, such an arrangement of a transverse leaf spring behind the wheels carried by the axle of the vehicle means that when the wheels are vertically displaced relative to the vehicle the ends of the spring undergo a greater displacement than the wheels. The suspension thus requires a large amount of space for its installation, which is undesirable generally in motor vehicles. Further the suspension is not an independent suspension, and therefore cannot provide the suspension characteristics generally considered desirable for vehicles such as passenger cars. It is a particular object of the present invention to overcome these disadvantages.

According to the present invention, we provide a suspension for a pair of wheels of a motor vehicle, comprising two arms one each side of the vehicle and each connected at its one end to the vehicle, for pivotal movement about an axis extending generally transversely of the vehicle, and having means supporting a respective wheel at or adjacent its other end; and a leaf spring extending transversely of the vehicle, connected at its ends to said arms between their ends, and supported relative to the vehicle at two spaced positions between the ends of the spring, for pivotal movement about generally horizontal and parallel axes.

In a suspension according to the invention, the connection of the ends of the leaf spring to the suspension arms between their ends, whilst the wheels are carried at or adjacent the ends of the arms remote from their ends which are pivoted to the vehicle, means that the ends of the spring undergo vertical movements relative to the vehicle which are less than those undergone by the wheels. The suspension thus minimises space required for its installation, as compared with the suspension previously proposed as described above. Further, movements of the wheels relative to the vehicle, although constrained relative to one another in the sense that the transverse leaf spring resists roll of the vehicle, are independent, i.e. not constrained by a live or dead axle beam. The suspension thus provides a good performance as is required for modern vehicles.

Preferably the leaf spring is a single leaf made from composite, fibre-reinforced plastics, material. In addition to the advantage of light weight for which composite leaf springs are well known, the spring is enabled to be designed to meet the suspension requirements of any particular vehicle, in respect of parameters such as the variation in thickness of the spring along its length. The spring can also be manufactured to incorporate features by which it is pivotally supported relative to the vehicle, and connected to the respective arms of the suspension.

Preferably each pivotal support of the spring is provided by a portion thereof held within an elastomeric element and a supporting structure, which supporting structure is secured to the vehicle. A composite spring can readily be provided with such a portion, e.g. of part cylindrical configuration.

Preferably the ends of the spring are connected to said arms by means providing for transmission of forces between the arms and spring in directions lengthwise of the spring. The spring thus assists in wheel location, so that further linkages or other constraining means are unnecessary. The suspension as a whole is thus effective, while utilising relatively few components, and is thus economical in manufacture.

The invention will now be described by way of example with reference to the accompanying drawings, of which;

FIG. 2 is a rear elevation of the suspension;

FIG. 3 is a side elevation of the suspension.

Figure 1:
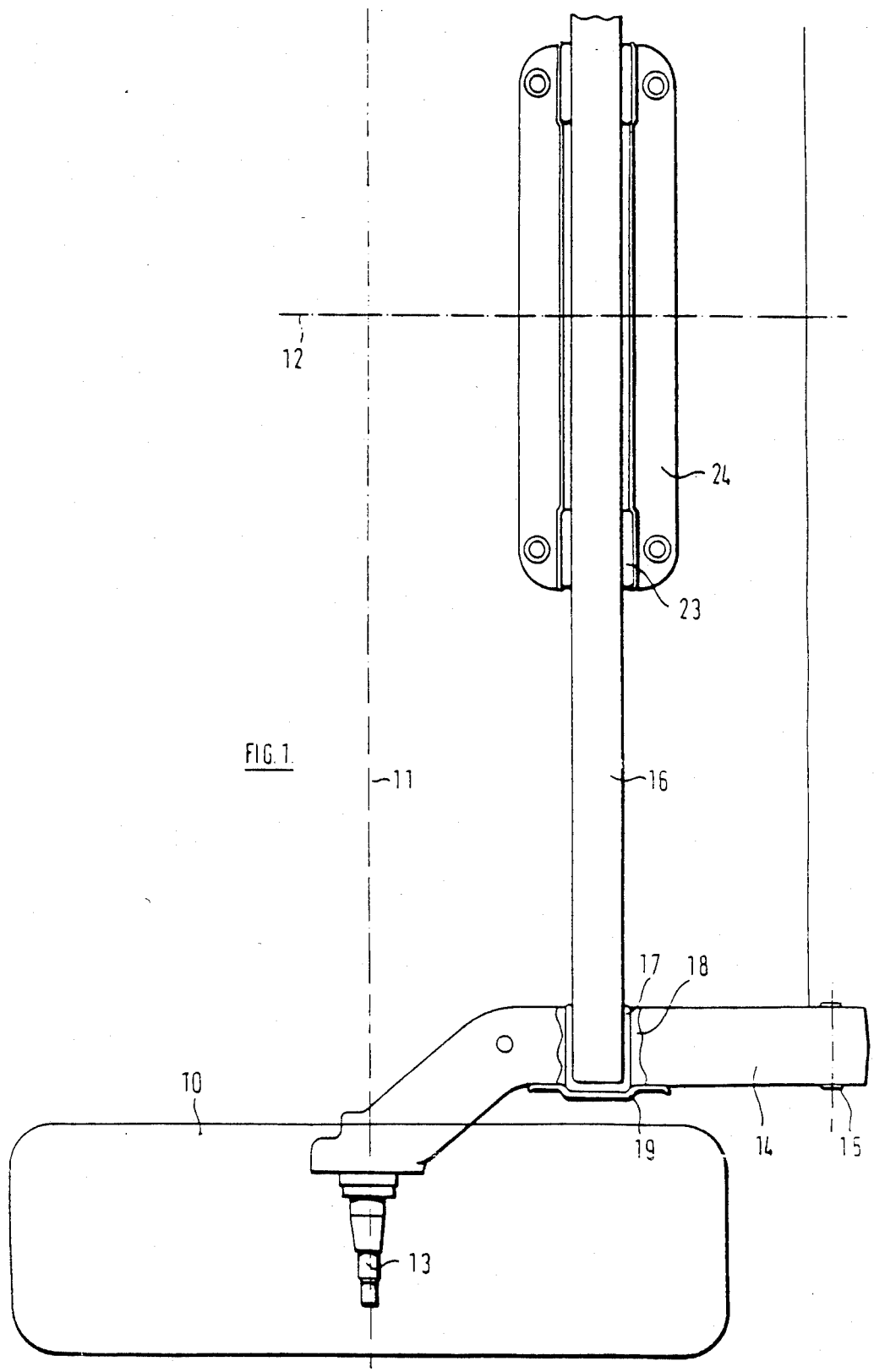
FIG. 1 is a plan view of part of a suspension according to the invention.

The illustrated suspension carries non-steerable wheels 10 of a motor vehicle, e.g. the rear wheels of a passenger car, and the axis of rotation of the wheels is indicated at 11. The longitudinal centre line of the vehicle is indicated at 12. The wheels are mounted, by suitable hub and bearing assemblies not shown, on stub axles 13 at the free ends of respective arms 14 which are pivotally mounted to the vehicle by suitable pivot bearings indicated generally at 15. The arms pivot about a common axis extending transversely of the vehicle, but in some applications they may have pivot axes inclined to one another. The pivoted ends of arms 14 will usually be their forward ends, with respect to the normal direction of travel of the vehicle.

A leaf spring 16 extends transversely of the vehicle. At its ends, the spring is connected to arms 14 generally at the centre regions of the arms. The spring is connected to each arm by fitting within an elastomeric element 17 in a correspondingly shaped socket defined by a part 18 of the arm, and retained by a cap 19. An enlarged portion 20 at the end of the spring ensures it cannot pull out of the socket in the arm. The connection between the spring and each arm is thus able to transmit forces therebetween in directions lengthwise of the spring.

The spring is supported relative to the vehicle at two spaced positions between its ends. These provide for pivotal movement of the spring about two generally horizontal axes 21, which are equally spaced on opposite sides of the longitudinal centre line 12 of the vehicle. Such pivotal movement of the spring is provided by enlarged portions 22 of the spring with part cylindrical external surfaces, held within elastomeric elements 23 in a supporting structure 24 secured to the vehicle. Between its pivot axes 21, the thickness of the spring is reduced so that it is able resiliently to deflect in such region.

The spring 16 is made of a composite, fibre reinforced plastics material, which enables it to be made in the configuration described and illustrated, and particularly to have a thickness and hence stiffness varying along its length as required.

A conventional telescopic damper 25 is provided for each arm 14, connected between the arm and the vehicle structure.

When in use, it will be appreciated that the arrangement of spring 16 acts to resist roll of the vehicle. If the wheel on one side of the vehicle is displaced upwardly relative to the vehicle, the portion of the spring between its pivotal mounting will be displaced downwardly, causing a tendency for the wheel on the other side of the vehicle also to be displaced upwardly to follow the first wheel. The provision of additional elements such as an anti-roll bar to achieve this effect is not necessary. At the same time, the spring assists wheel location in directions transversely of the vehicle to eliminate the need for additional linkage for this purpose, thereby providing a highly cost effective suspension.

Although the invention is described above in relation to non-steerable wheels of a vehicle, it is also applicable to steerable wheels. It is applicable to unpowered vehicles, i.e. trailers or semi-trailers, as well as to powered motor vehicles.

I claim:

1. A suspension for a pair of wheels of a motor vehicle, comprising:
   two suspension arms, one disposed at each side of the vehicle and extending generally longitudinally of the vehicle;
   means connecting a respective one end of each said suspension arm to the vehicle, for independent pivotal movement about an axis extending generally transversely of the vehicle;
   means supporting the respective wheel at the other end of each said suspension arm;
   a leaf spring disposed to extend transversely of the vehicle, in a region between said suspension arms and between the ends of each of said suspension arms;
   means connecting a respective end of said spring to each of said suspension arms at a position between the ends thereof; and
   means supporting said leaf spring relative to the vehicle, at two positions spaced between the ends of the spring, for pivotal movement about respective generally horizontal axes extending longitudinally of the vehicle.

2. A suspension according to claim 1 further characterised in that said leaf spring (16) is made of composite, fibre-reinforced plastics, material.

3. A suspension according to claim 2 further characterised in that each said pivotal support of the spring is provided by a portion (22) thereof held within an elastomeric element (23) and a supporting structure (24).

4. A suspension according to claim 1 further characterised in that each of said ends (20) of the spring is connected to the respective arm (14) by means providing for transmission of forces between the arm and spring in directions lengthwise of the spring.

5. A suspension according to claim 4 further characterised in that each said end of the spring has a portion (20) received and retained in a socket (18) in the respective arm (14), with an elastomeric element (17) interposed therebetween.

6. A suspension according to claim 1, further characterised by damper means (25) connected between each of said arms (14) and the vehicle.

* * * * *